United States Patent
Carlson et al.

(10) Patent No.: US 6,911,905 B2
(45) Date of Patent: *Jun. 28, 2005

(54) DEVICE AND SYSTEM FOR INDICATING RAPID DECELERATION IN VEHICLES

(75) Inventors: Craig D. Carlson, Boston, MA (US); J. Thomas Fowler, Marblehead, MA (US)

(73) Assignee: Competitive Technologies, Inc., Fairfield, CT (US)

(*) Notice: Subject to any disclaimer, the term of this patent is extended or adjusted under 35 U.S.C. 154(b) by 46 days.

This patent is subject to a terminal disclaimer.

(21) Appl. No.: 10/188,338

(22) Filed: Jul. 2, 2002

(65) Prior Publication Data

US 2003/0122663 A1 Jul. 3, 2003

Related U.S. Application Data

(62) Division of application No. 09/538,592, filed on Mar. 27, 2000, now Pat. No. 6,417,767.

(51) Int. Cl.[7] .................................................. B60Q 1/50
(52) U.S. Cl. ...................... 340/467; 340/438; 340/439; 340/468; 340/479; 340/901; 340/905
(58) Field of Search ................................. 340/467, 439, 340/438, 468, 901, 905; 701/1, 29; 33/335, 336, 337; 73/118.1, 146

(56) References Cited

U.S. PATENT DOCUMENTS

| 5,825,284 A | * | 10/1998 | Dunwoody et al. | ......... 340/440 |
| 6,038,495 A | * | 3/2000 | Schiffmann | .................... 701/1 |
| 6,081,188 A | * | 6/2000 | Kutlucinar et al. | ......... 340/438 |
| 6,092,005 A | * | 7/2000 | Okada | ........................ 340/905 |
| 6,130,608 A | * | 10/2000 | Mckeown et al. | .......... 340/438 |

* cited by examiner

Primary Examiner—Jeffery Hofsass
Assistant Examiner—Hung Nguyen
(74) Attorney, Agent, or Firm—Wolf, Greenfield & Sacks

(57) ABSTRACT

A device and system for indicating rapid deceleration to warn the operator and/or others of an urgent deceleration condition is provided. The device includes one or more sensors that are responsive to acceleration in the primary direction of vehicle motion. The controller communicates with the one or more sensors, corrects for gravitational effects, and initiates at least one warning indicator when the sensed acceleration exceeds a threshold value and thereby indicates an urgent deceleration condition.

18 Claims, 5 Drawing Sheets

DEVICE AND SYSTEM FOR INDICATING RAPID DECELERATION IN VEHICLES

RELATED APPLICATIONS

This application claims the benefit of and is a divisional of U.S. patent application Ser. No. 09/538,592, filed on Mar. 27, 2000, now U.S. Pat. No. 6,417,767, issued Jul. 9, 2002.

BACKGROUND OF THE INVENTION

1. Field

The present invention relates to urgent deceleration indicating devices and systems and, more particularly to devices and systems that augment existing vehicle braking indicating devices and systems.

2. Related Art

Vehicles have long incorporated brake lights for warning others that the vehicle is decelerating. The brake lights are turned on when the brake pedal is depressed to indicate to the following driver that the vehicle is likely decelerating. However, the brake light merely indicates to the following driver whether the brakes are applied and give no indication as to the urgency of the braking condition or any indication of the magnitude of deceleration of the vehicle. Thus, the following driver must always be alert and realize that any illumination of a vehicle's brake lights can be a gentle deceleration or a sudden urgent deceleration.

Prior devices and systems have been described that detect and indicate the urgency of a braking condition by illumination of a light. Some of these warning devices are self-contained and include some means for detecting deceleration in the primary direction of vehicle motion. For example, these devices use one or more accelerometers to determine vehicle deceleration in the primary direction of vehicle motion. An indication, such as illumination of the light when the deceleration exceeds a threshold, is then provided.

Because these devices only detect acceleration and only in one direction, they do not measure acceleration independent of gravitational effects and, thus, are prone to false triggers or trigger failures if the vehicle is not in a horizontal orientation when it urgently decelerates. When the vehicle is tilted, e.g., on a slope, the acceleration due to gravity is sensed by the accelerometer, but is assumed to be driver induced by the control circuit of the device. Thus, because of the sensed acceleration due to gravity, these warning devices will cause a false trigger or will fail to trigger such as when the vehicle is travelling up or down a slope.

The prior art also shows that some false triggers or trigger failures may be decreased by warning systems that are responsive to other vehicle operating parameters such as pressure sensed in the hydraulic braking system, wheel velocity or slip sensed by the anti-lock braking system, or distance sensed by a proximity radar system. However, these warning systems are not self-contained, and in addition, require a complex system of multiple sensors with extensive wiring. As a result, these warning systems are difficult and costly to manufacture and install, particularly if retro-fitting existing vehicles.

SUMMARY OF THE INVENTION

The present invention is therefore directed to a device and system to indicate an urgent deceleration that overcome the above-noted and other disadvantages of prior warning devices and warning systems. The present invention results in a warning device and system that indicate urgent deceleration independent of gravity effects. The device and system are capable of sensing acceleration in at least one direction, for example, the primary direction of vehicle motion and correcting for acceleration forces due to gravity before initiating a warning. In this respect, the Inventors have found that correcting for the acceleration due to gravity, an example of which is described herein, may be employed to render a warning device less prone to false triggering or trigger failures.

In one illustrative embodiment of the invention, an urgent deceleration indicating device to selectively activate a warning indicator is disclosed. A sensor system, having a sensor output, is responsive to acceleration in a primary direction of vehicle motion. A controller responds to the sensor system, corrects for gravitational effects, and initiates at least one warning indicator when the acceleration exceeds at least one threshold value.

In another illustrative embodiment of the invention, a system for indicating an urgent deceleration condition independently of gravity is provided. The system includes at least one warning indicator suitable for mounting to a vehicle. A sensor system, having a sensor output, is responsive to acceleration in a primary direction of vehicle motion. A controller responds to the sensor system, corrects for gravitational effects, and initiates at least one warning indicator when the acceleration exceeds at least one threshold value.

In still another embodiment of the invention, an urgent deceleration indicator is provided. The indicator includes means for indicating a warning and means for detecting acceleration having at least one output. The indicator also includes means responsive to the output of the detecting means. The means for responding also corrects for gravitational effects and initiates the means for indicating when the acceleration exceeds at least one threshold value.

In yet another illustrative embodiment of the invention, a device for use in a vehicle to indicate an urgent deceleration condition independently of gravity is provided. The device includes a base constructed and arranged to mount to the vehicle. The base has a first axis which is substantially alignable with a primary direction of vehicle motion. The base also has a second axis which is different from the first axis. The device also includes at least one sensor mounted to the base for sensing acceleration in the first axis. The device includes a controller which communicates with the at least one sensor and corrects for gravitational effects. The controller initiates at least one warning indicator when the acceleration exceeds at least one threshold value.

In another illustrative embodiment of the invention, a method for indicating an urgent deceleration condition independently of gravity is disclosed. The method includes the step of detecting acceleration substantially in a primary direction of vehicle motion. The method further includes the steps of correcting for effects due to gravity and comparing the acceleration with at least one threshold value. The method further includes the step of initiating at least one warning indicator when the acceleration exceeds at least one threshold value.

In a further embodiment of the invention, a device for use in a vehicle to rearwardly indicate a rapid deceleration of the vehicle is provided. The device includes an elongated array of light emitting diodes extending substantially perpendicular to the longitudinal axis of the vehicle. The device also includes a circuit that has sensor output responsive to acceleration in the direction of the longitudinal axis of the vehicle. The circuit is aligned primarily parallel to and behind the elongated array.

Various embodiments of the present invention provide certain advantages and overcome certain drawbacks of prior devices and systems. Embodiments of the invention may not share the same advantages and those that do may not share them under all circumstances. This being said, the present invention provides numerous advantages including the noted advantage of reducing false triggering or trigger failures.

Further features and advantages of the present invention as well as the structure and method of making various embodiments of the present invention are described in detail below with reference to the accompanying drawings.

BRIEF DESCRIPTION OF THE DRAWINGS

Various embodiments of the invention will now be described, by way of example, with reference to the accompanying drawings, in which.

DETAILED DESCRIPTION

The present invention is directed to a device and system for indicating rapid deceleration in a vehicle, and more particularly to a device and system that augment existing brake indicating systems to warn the vehicle operator and/or others of an urgent deceleration condition, and method of indicating the same. The disclosed device, system, and method indicate an urgent deceleration independent of gravity effects. The device includes at least one sensor that is responsive to acceleration in the primary direction of vehicle motion. A controller communicates with the sensor and resolves the output from the sensor into an acceleration in the primary direction of vehicle motion and corrects for gravitational effects. The controller initiates a warning when the acceleration exceeds a threshold value and thereby indicates an urgent deceleration condition. It should be noted that the term "acceleration" may be used herein generically to indicate the rate of change of velocity of a moving object. In addition, the term "acceleration" may be used to indicate both an increase in the rate of change of velocity and a decrease in the rate of change of velocity and is used interchangeably with the term "deceleration."

Although the invention for indicating rapid deceleration to which this patent is addressed is discussed below particularly in connection with use in a motor vehicle such as a car, truck, motorcycle, or tractor, it should be appreciated that the present invention is not limited in this respect, and that the aspects of the present invention described below may be used in association with other types of vehicles or machinery.

Figure 1:
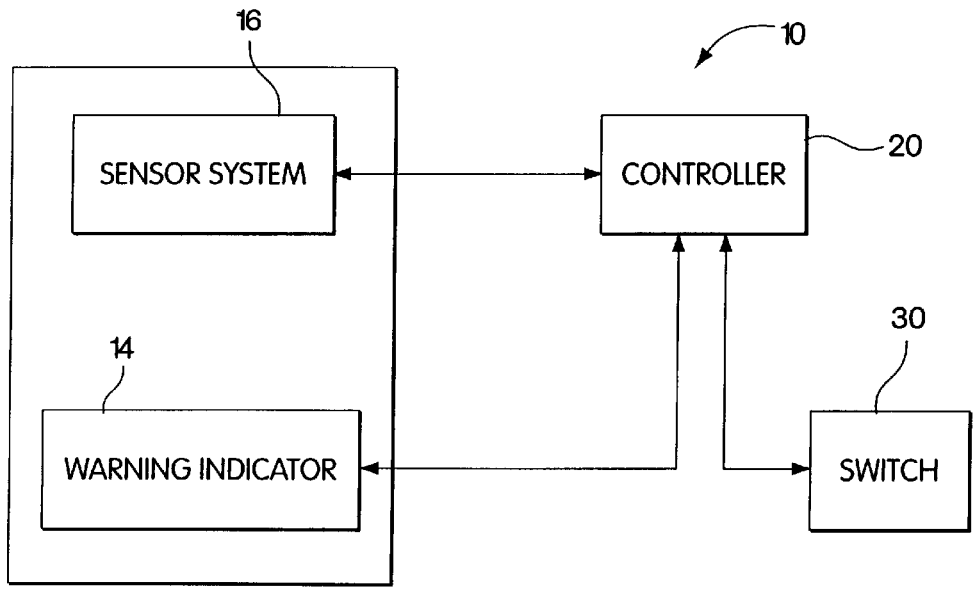
FIG. 1 is a block diagram of an embodiment of the invention.
Figure 2:
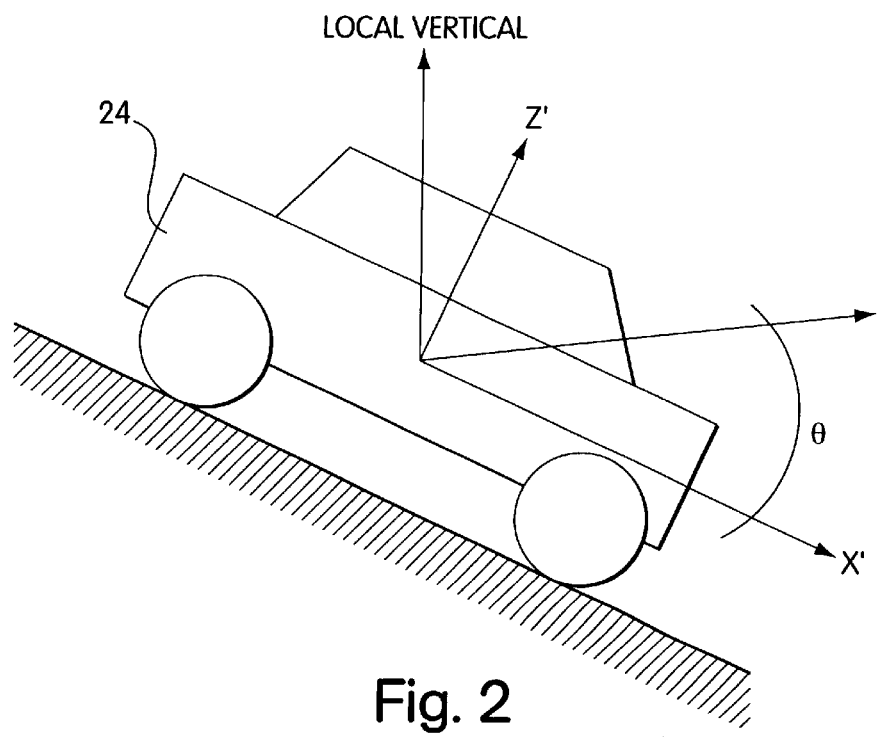
FIG. 2 is a schematic representation of an embodiment of the coordinate system of one embodiment of the invention.

FIG. 1 illustrates one embodiment of an indicating device 10 for indicating rapid deceleration of a vehicle. Indicating device 10 is responsive to acceleration in a first axis that is substantially in the primary direction of vehicle motion X'. As shown in the illustrative embodiment of FIG. 2, the primary direction of vehicle motion X' is along the longitudinal axis of vehicle 24, i.e., the normal, forward direction of motion of a vehicle 24. Continuing with FIG. 1, device 10 includes an indicator 14 and a sensor system 16. The sensor system 16 is responsive to acceleration in the primary direction of vehicle motion X'. Controller 20 communicates with sensor system 16, resolves sensor system 16 output into an acceleration sensed in the primary direction of vehicle motion X', and corrects for effects due to gravity, using, for example, the pitch angle of the vehicle, as will be further described hereinafter. When travelling up or down a slope, the acceleration due to gravity may be sensed in the X' direction by sensor system 16. Thus, the acceleration sensed in the X' direction is a function of the pitch angle of the vehicle 24. The Inventors have found that accounting for gravity reduces false initiation of the warning indicator 14 and reduces failures to initiate the warning indicator 14. It should be noted that the term "indicator failure" is used herein to indicate a false initiation of warning indicator 14 or a failure to initiate warning indicator 14.

If the acceleration exceeds the acceleration threshold value, controller 20 communicates Is with indicator 14 and initiates the warning indicator 14 to indicate the urgent deceleration condition. In one embodiment of the invention, the acceleration threshold is preset and is not adjustable, however, those skilled in the art will recognize the possibility of allowing for adjustment of the acceleration threshold by the vehicle operator or by a certified technician.

In one embodiment of the invention, the effects due to gravity sensed in the X' direction may be calculated using the equation:

$$X_{grav} = M_{grav} * \sin\theta \quad [1]$$

where $X_{grav}$ is the acceleration due to gravity sensed in the X' direction, $M_{grav}$ is the magnitude of acceleration due to gravity, and $\theta$ is the pitch angle of the vehicle 24. In one embodiment of the invention, controller 20 may assume the constant acceleration due to gravity to be equal to 1.0 G. Any variations in the gravity acceleration due to temperature, location, or altitude are substantially negligible. However, the present invention is not limited in this respect and the threshold value may be adjusted based on these or other parameters. If the magnitude of acceleration due to gravity is equal to 1.0 G, then the acceleration due to gravity sensed in the X' direction is merely the sine of the pitch angle of the vehicle.

In another embodiment of the invention, the controller 20 may use the calculated acceleration due to gravity in the X' direction to resolve the output of sensor system 16 into an acceleration in the X' direction independent of gravity effects using the equation:

$$X_{ind} = X - \sin\theta \quad [2]$$

where $X_{ind}$ is the acceleration in the X' direction independent of gravity effects, X is the component of acceleration sensed substantially along the primary direction of vehicle motion X', $\sin\theta$ is the acceleration due to gravity sensed in the X' direction assuming that the acceleration due to gravity is substantially equal to 1.0 G, and $\theta$ is the pitch angle of vehicle 24. In one illustrative embodiment of the invention, sensor system 16 has a first output indicating the sensed acceleration substantially exclusively in the primary direction of vehicle motion X'. Thus, the X component in the above equation is merely the first output of sensor system 16. It is to be appreciated that the present invention contemplates systems and devices that are responsive to acceleration in other directions than the primary direction of vehicle motion. However, if sensor 16 does not have an output which substantially exclusively indicates X in the X' direction, then other parameters, such as the mounting angle of sensor 16, may be required to separate the output into its corresponding vector components in the X' direction.

Thus, in one embodiment of the invention, the acceleration in the X' direction is corrected for effects due to gravity and the threshold may equal the acceleration indicative of an urgent deceleration condition. In one illustrative embodiment of the invention, a deceleration greater than a threshold value of 0.3 G is considered to be an urgent deceleration. In one embodiment of the invention, the controller 20 may initiate warning indicator 14 if the absolute value of the corrected acceleration of the vehicle in the X' direction exceeds the threshold value indicative of an urgent deceleration condition. In one embodiment of the invention, controller 20 communicates with the vehicle 24 braking system and any detected acceleration, whether acceleration or deceleration, is assumed to be deceleration if it exceeds the acceleration threshold, since vehicles usually decelerate when the brake is applied. In another embodiment of the invention, the controller 20 determines the direction of the detected acceleration forces and only initiates warning indicator 14 when those forces indicate a deceleration.

Rather than correcting for the effect of gravity in the acceleration sensed in the X' direction, controller 20 may correct the threshold on the opposite side of the above equation, for effects due to gravity. Thus in another embodiment of the invention, the acceleration in the X' direction which includes the acceleration effects due to gravity is compared to a threshold value that equals the acceleration indicative of an urgent deceleration and the acceleration due to gravity in the X' direction. Thus, the threshold G is dependent on the acceleration indicative of an urgent deceleration condition $G_{urgent}$ and the pitch angle $\theta$ of the vehicle, as in the equation:

$$G = G_{urgent} + \sin\theta \qquad [3]$$

Thus, if the acceleration indicative of an urgent deceleration condition equals 0.3 G, then, in a level situation, the acceleration threshold may equal 0.3 at a pitch angle of 0 degrees. When in a downhill situation, the acceleration threshold may equal −0.04 at a pitch angle of 20 degrees. In another example, the acceleration threshold may equal −0.41 at a pitch angle of 45 degrees. In contrast, when in a uphill situation, the acceleration threshold may equal 0.64 at a pitch angle of 20 degrees and the acceleration threshold may equal 1.01 at a pitch angle of 45 degrees. Controller 20 may determine these dynamic threshold values from the pitch angle and the preferred deceleration indicative of an urgent deceleration condition, however, those skilled in the art will recognize that many methods are capable of determining the proper threshold value, including, but not limited to table look up values.

Those skilled in the art will recognize that many devices are capable of determining the acceleration of the vehicle in the X' direction, including but not limited to accelerometers, proximity radar systems, vehicle locator devices including the Global Positioning System, and inertia switches. Furthermore, those skilled in the art will recognize that many devices are capable of determining the pitch angle of the vehicle, including but not limited to, pitch indicators, horizon sensors, digital or analog inclinometers, and accelerometers. Although the sensor system below may be discussed below particularly in connection with multiple accelerometers, it should be appreciated that the present invention is not limited in this respect, and that the aspects of the present invention may include other types of single or multiple sensors and/or systems.

Figure 7:
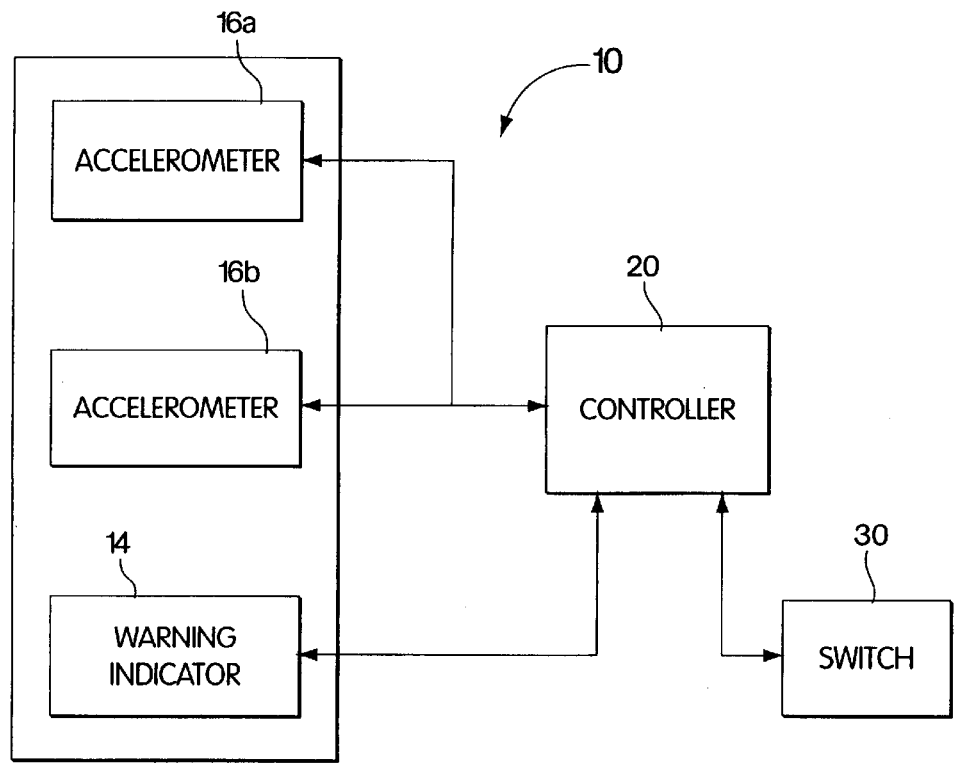
FIG. 7 is a block diagram of an embodiment of the invention.

In one embodiment of the invention shown schematically in FIG. 7, sensor system 16 may include at least two accelerometers, a first accelerometer 16a and a second accelerometer 16b. First accelerometer 16a is responsive to acceleration in the primary direction of vehicle motion X'. Second accelerometer 16b is responsive to acceleration in a direction other than the primary direction of the vehicle Z'. As shown in the illustrative embodiment of FIG. 2, the vehicle vertical direction Z' may be substantially aligned with the local vertical, i.e., the direction of the Earth's local gravity vector, when the vehicle 24 is level.

Although the vehicle vertical direction Z' is shown and described as being substantially orthogonal to the primary direction of vehicle motion X', it is to be appreciated that the present invention is not limited in this respect and that other angular relationships between the Z' direction and the X' direction may be employed as long as the Z' direction and X' direction are not parallel. Thus, it is to be appreciated that the present invention contemplates systems and devices that are responsive to acceleration in both the primary direction of vehicle motion and in directions other than the primary direction of vehicle motion.

Continuing with FIG. 7, although two accelerometers 16a, 16b are schematically shown and described, the present invention is not limited in this respect and a single accelerometer, as discussed above, or multiple accelerometers may be employed provided acceleration may be sensed in the primary direction of vehicle motion X' and their output may be corrected for effects due to gravity. Accelerometers 16a, 16b are well known in the art and are preferentially micro-mechanical or solid state accelerometers. In addition, accelerometers 16a, 16b may be capable of being fine tuned to detect deceleration within 0.1 G and may detect acceleration within one millisecond. In one embodiment of the invention, acceleration measurements are made using part numbers AD XL202 or AD XL210 Dual Axis iMEMS Accelerometer with Digital Output, both available from Analog Devices of Norwood, Mass., USA. Additional accelerometers and/or pitch indicators may be employed for redundancy.

Calibration of accelerometers 16a, 16b is well known in the art and may correct or compensate for electronic offset of the accelerometer output, output scaling errors, or pitch offset. Zeroing the output of accelerometers 16a, 16b may remove any electronic offset inherent in any output of accelerometers 16a, 16b. Additional calibration may be performed to ensure that the measured acceleration is correct, however, normal factory output is typically within 1–2% of the actual sensed acceleration. Preferably, any errors may be removed from the output of accelerometers 16a, 16b by a scaling factor programmed within controller 20. In one embodiment, controller 20 may automatically compensate for any pitch offset of accelerometers 16a, 16b using suitable techniques, such as coordinate transformation. The present invention is not limited in these respects and the outputs of accelerometers 16a, 16b may be adjusted using these or other parameters or methods.

Controller 20 communicates with accelerometers 16a, 16b and in one embodiment may resolve their output by calculating the acceleration sensed in the X' direction and calculating the pitch angle of the vehicle 24. As above, the controller 20 may then determine the corrected acceleration in the X' direction independent of gravity effects and compare it with an acceleration indicative of an urgent deceleration condition. Alternatively, the controller 20 may determine the uncorrected acceleration sensed in the X' direction and compare it with the acceleration indicative of an urgent deceleration condition including the effects of gravity.

In a further embodiment of this invention, controller 20 may determine the magnitude of acceleration sensed in both the X' and Z' directions and compare the magnitude of acceleration to a magnitude acceleration threshold. The magnitude acceleration threshold is dependent on the acceleration indicative of an urgent deceleration situation, the acceleration due to gravity, and the pitch angle of the vehicle 24. The magnitude acceleration threshold is determined, as is well known, by the equation:

$$M = \sqrt{X^2 + Z^2} \quad [4]$$

where the X component is the acceleration indicative of an urgent deceleration condition including the effects of gravity due to the pitch angle of the vehicle and the Z component is the acceleration due to the effects of gravity in the Z' direction. Thus, if the acceleration indicative of an urgent deceleration condition equals 0.3 G, then examples of the magnitude acceleration threshold at various pitch angles are as follows: 1.04 at a pitch angle of 0 degrees; 1.14 at a pitch of 20 degrees; and 1.38 at a pitch angle of 45 degrees.

In calculating the magnitude of the acceleration in the X' and Z' directions, controller 20 also uses the above magnitude equation [4] to resolve the output from accelerometers 16a, 16b into an acceleration magnitude, however the X component in the above equation is the component of acceleration sensed substantially along the primary direction of vehicle motion X' and the Z component in the above equation [4] is the acceleration sensed substantially in a direction orthogonal to primary direction of vehicle motion, i.e., vehicle vertical direction Z'.

In the illustrative embodiment described, first accelerometer 16a is responsive to acceleration substantially exclusively in the primary direction of vehicle motion X' and second accelerometer 16b is responsive to acceleration substantially exclusively in the vertical direction Z'. Thus, the X component in the magnitude equation is merely the output of first accelerometer 16a and the Z component in the above equation is the output of second accelerometer 16b.

As mentioned above, many different accelerometer sensing orientations may be employed to provide sensing of acceleration in the X' and Z' directions. For example, accelerometers 16a, 16b oriented orthogonal to each other substantially in the X'-Z' plane but not substantially aligned in the X' and Z' directions, may be employed for sensing acceleration in the vehicle vertical direction Z' and in the primary direction of vehicle motion X'. The magnitude of the acceleration remains the sum of the squares of the outputs of accelerometers 16a, 16b as described in equation [4]. Thus, if accelerometers 16a, 16b are oriented substantially orthogonal to one another, the magnitude equation is substantially independent of the mounting angle of accelerometers 16a, 16b.

In addition, those skilled in the art will recognize that accelerometers 16a, 16b need not be oriented substantially orthogonal to each other. However, if accelerometers 16a, 16b sense acceleration in respective directions that are not substantially orthogonal to each other, as will be readily appreciated by those of skill, then other parameters, such as the angle of their orientation from the X' axis or Z' axis, may be required to separate each output into its corresponding X and Z vector components before controller 20 may determine the acceleration magnitude and the magnitude acceleration threshold.

If at least one accelerometer 16b senses acceleration substantially in the vehicle vertical direction Z' or if accelerometers 16a, 16b are oriented orthogonal to each other, the pitch angle of the vehicle 24 may be calculated or if the vehicle 24 is level, the mounting angle of accelerometers 16a, 16b may be calculated. Knowing that acceleration is substantially equal to 1.0 G due to the effects of gravity, the pitch angle of the vehicle 24 or the mounting angle of accelerometers 16a, 16b may be calculated as the arc-cosine of the reciprocal of the acceleration substantially in the vehicle vertical direction Z'. As is noted above, the pitch angle of the vehicle 24 may be determined by other methods and/or with other devices known in the art.

To decrease the incidence of indicator failures due to bumps, pot holes, etc., in one embodiment of the invention, the pitch angle of the vehicle may be used to further augment the acceleration threshold to initiate warning indicator 14. Thus, in one embodiment of the invention, warning indicator 14 is initiated only when the acceleration exceeds the acceleration threshold value and when the absolute value of the pitch angle of the vehicle 24 is not greater than an angle threshold value. Thus, if the vehicle 24 is pitched up or down at an angle sufficient to indicate a sudden bump, controller 20 will not initiate warning indicator 14. Controller 20 will assume that any sensed deceleration is not an urgent deceleration, but rather, a sudden and momentary deceleration. In one embodiment, the angle threshold value is substantially equal to 45 degrees, although other and/or additional angle thresholds may be employed. As with the acceleration threshold, the angle threshold may be adjustable. The invention is not limited in this respect as other suitable methods for compensating for road irregularities may be implemented.

In some instances, it may be necessary to correct for the calculated pitch angle. For example when determining the pitch angle of the vehicle using the arc-tangent of Z divided by X, controller 20 may compare the current pitch value with an initial value of pitch determined before the deceleration condition since the X value will indicate acceleration in the primary direction of vehicle motion X'. Thus, in one embodiment, if the current pitch angle of the vehicle is less than the initial pitch angle plus the angle threshold value or is greater than the initial pitch angle minus the angle threshold value, controller 20 may assume that any sensed deceleration is an urgent deceleration condition.

Figure 3:
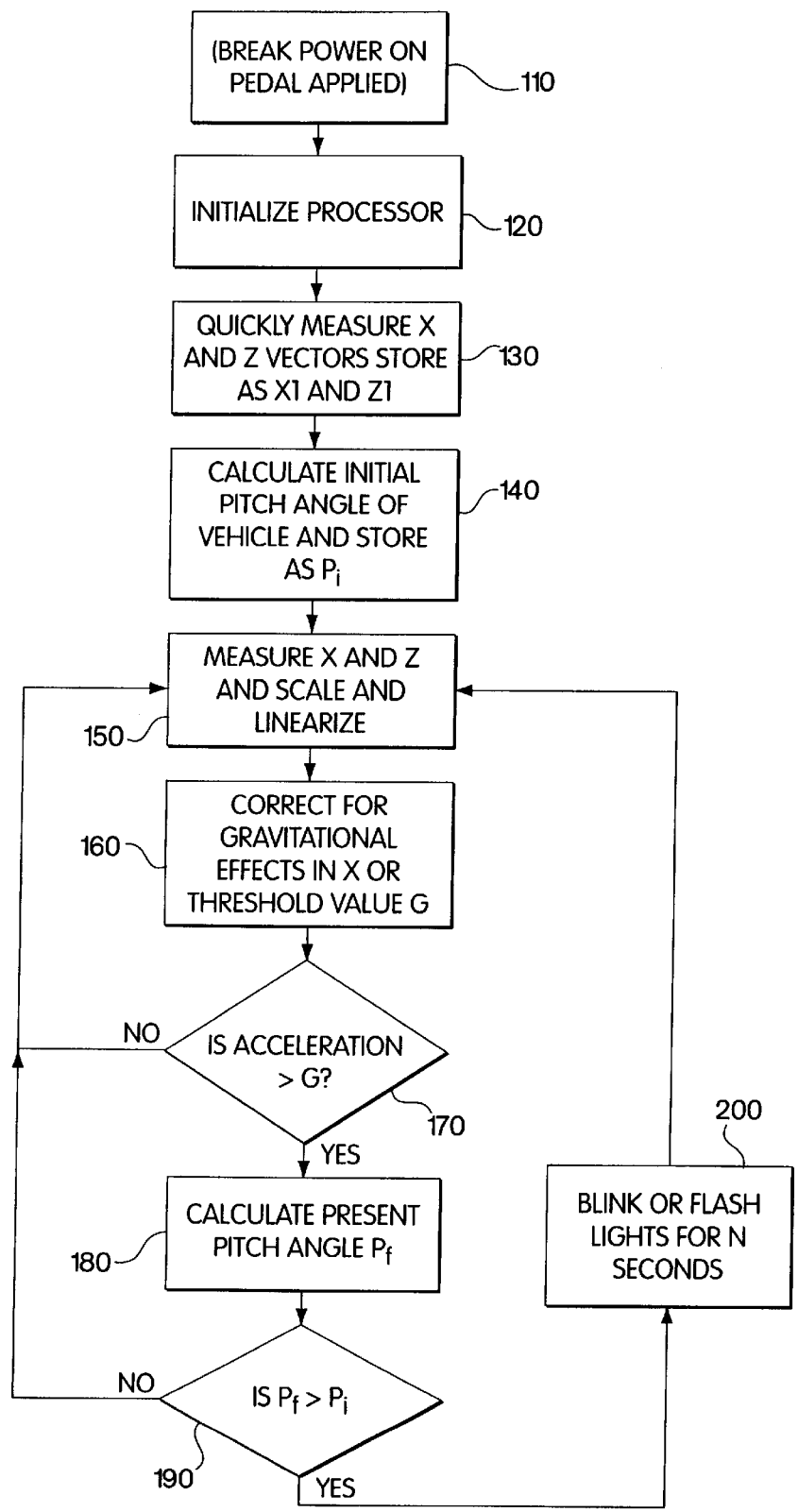
FIG. 3 is a flow chart of an embodiment of the invention.

Now referring to FIG. 3, a flow chart of an embodiment of the invention directed to a method of indicating rapid deceleration independent of gravity is shown. The controller is powered on at step 110, and in one embodiment, this power is provided through a switch by application of the brake pedal. Of course, other means for powering the controller may be employed. Preferably, the controller may initiate the warning indicator within 2 milliseconds of being powered on. After the controller is powered, the controller initializes its processor at step 120. At step 130, at least one sensor measures acceleration in the X' direction and stores that value in the controller as X1. In one embodiment of the invention, the at least one sensor also measures acceleration in the Z' direction and stores that value in the controller as Z1. At step 140, the controller may then determine the initial pitch angle $P_i$ of the vehicle, which, in one embodiment of the invention, is the arc-cosine of Z1 or, as noted above, is an output from the at least one sensor. At step 150, the sensor measures acceleration in the X' direction and the controller stores that output as X. In one embodiment of the invention at step 150, then sensor may also measure acceleration in the Z' direction and the controller may store that output as Z. Also at step 150, the controller, in one embodiment of the invention, may compensate for any manufacturing or installation offsets in the sensor output. At step 160, the controller corrects for gravitational effects, as noted above, in the acceleration value stored as X, in threshold value G, or in using a magnitude of acceleration. In one embodiment of the invention, the controller may determine the acceleration in the primary direction of vehicle motion X' by subtracting the sine of the initial pitch angle $P_i$ from the value stored as X. In another embodiment of the invention, the controller may determine an acceleration threshold which includes the effects of gravity in the X' direction. In another embodiment of the invention, the controller may determine the magnitude of acceleration in the X' and Z' directions and may calculate or look up a magnitude acceleration threshold. At step 170, the controller compares the acceleration with a threshold value G. If the absolute value of the acceleration does not exceed the threshold value G, then the sensor continues to measure acceleration in the X' direction as input into the controller by returning to step 150. If the acceleration exceeds threshold G, then in one embodiment of the invention, at step 180 the controller calculates the current pitch angle $P_f$. At step 190, the controller compares the calculated pitch value $P_f$ with a pitch threshold angle. If the absolute value of the current pitch angle $P_f$ exceeds the pitch threshold angle, then the sensor continues to measure acceleration in the X' direction by returning to step 150. If the absolute value of the current pitch angle $P_f$ does not exceed the pitch threshold angle, then at step 200, the controller initiates the warning indicator, which in one embodiment is lights. The warning indicator may intermediately actuate, such as blinking or flashing, or may continuously actuate, such as steadily burn. In one illustrative embodiment, the warning indicator remains activated for at least as long as the urgent deceleration condition occurs, and more preferably for an additional period of time, which in one embodiment, is approximately in the range of 5–10 seconds.

Controller 20 may be any suitable controller now known or later developed. Controller 20 may be a stand-alone controller, such as an electronically programmable chip, or any other programmable device such as a CPU. The controller 20 may communicate with any vehicle controller, such as the electronic engine controller, the vehicle navigational computer, or the vehicle communications equipment such as analog or digital wireless phones or other communication devices. Alternatively, a separate controller 20 need not be provided at all, rather, the device 10, without the controller 20, may be coupled to any of the aforementioned devices. Controller 20, which in turn may power the accelerometers 16a, 16b and the warning indicator 14, may be powered by an independent power source (not shown) well known in the art including batteries or the vehicle power source. The controller 20 may be continuously powered or powered through depression of the brake pedal.

To further augment device 10, controller 20 may also accept input from other systems of the vehicle, including, but not limited to, a pressure sensor in the hydraulic braking system, a wheel velocity or slip sensor in the anti-lock braking system, or a proximity radar sensor sensing distance to other vehicles or objects. These systems may improve performance of the device 10 when the vehicle is in an urgent braking condition but is not substantially decelerating. Such a condition may occur when the vehicle 24 is skidding on ice or some other low friction surface. For example, accelerometers 16a, 16b may not detect any deceleration if the vehicle 24 is skidding, and controller 20 may not initiate warning indicator 14. Thus, additional input indicating a vehicle skid may initiate warning indicator 14.

Figure 4:
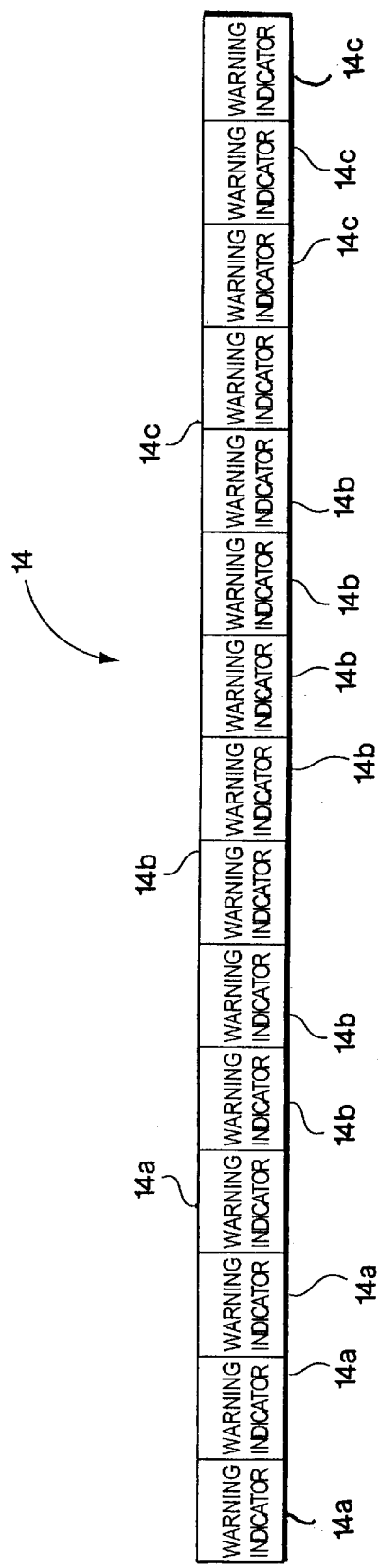
FIG. 4 is a schematic representation of an embodiment of the invention.
Figure 5A:
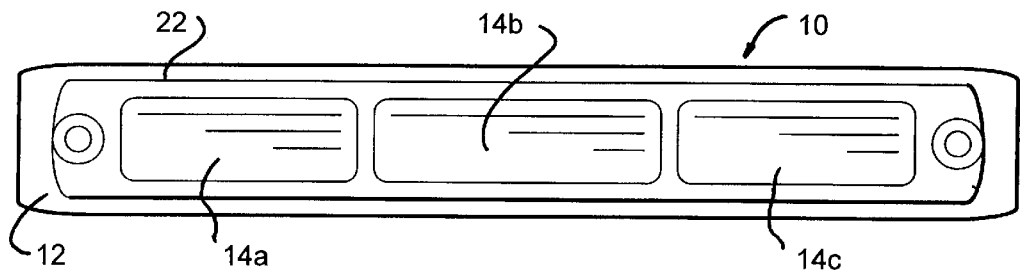
FIG. 5A is a front view of an embodiment of the invention.
Figure 5B:
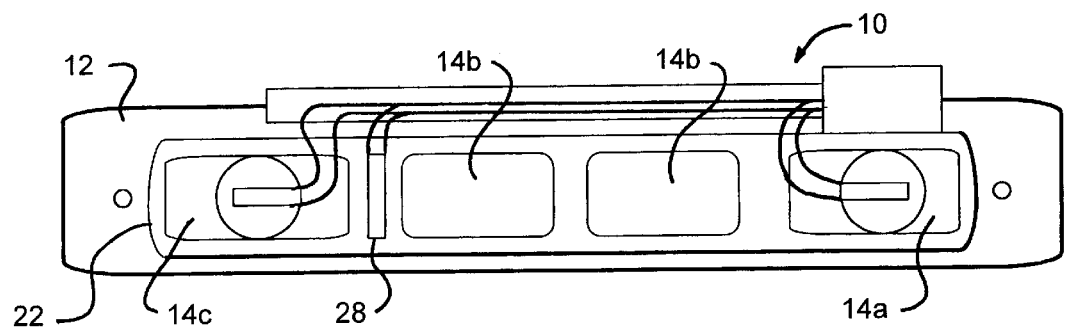
FIG. 5B is a rear view of an embodiment of the invention.

Warning indicator 14 comprises any suitable device known in the art and preferably provides a sufficient warning of an urgent deceleration condition. Those skilled in the art will recognize that many warning indicators, including but not limited to lights and audible alarms, may be employed to indicate an urgent deceleration condition. Lights suitable for use as warning indicator 14 are well known in the art and include, but are not limited to, incandescent bulbs, halogen bulbs, light emitting diodes (LEDs), and fiber optic cables. These lights may be suitable for use as a vehicle brake lamp, a center high mount stop lamp, or a vehicle cargo light. In one embodiment of the invention, warning indicator 14 is a light placed contiguous to an existing vehicle light such as a brake lamp, center high mount stop lamp, or cargo light. For example, as shown in FIGS. 4, 5A, and 5B, warning indicator 14 includes a first light or set of lights 14a placed to one side of the vehicle light or set of lights 14b and a second light or set of lights 14c placed to the other side of the vehicle light or set of lights 14b. When initiated, controller 20 may illuminate the light of warning indicator 14 with a constant illumination, flash the light, or if two or more lights or set of lights 14a, 14c are used, the lights or set of lights 14a, 14c may alternately flash when initiated. If flashing is used, the flash rate may be substantially equal to 2 times per second, although other flash rates may be employed.

FIGS. 5A and 5B illustrate one embodiment of an indicating device 10 for indicating rapid deceleration of the vehicle 24. As discussed above, warning indicator 14 includes a first light or lights 14a placed to one side of a vehicle light or lights 14b, for example, a center high mount stop lamp. Warning indicator 14 also includes a second light or lights 14c placed to the other side of the vehicle light or lights 14b. In the illustrated embodiment, warning indicator lights 14a, 14c are positioned contiguous to a center high mount stop lamp 14b.

Warning indicators 14a, 14b, 14c may be mounted to base 12, which provides a sound, stable, and durable platform. Accelerometers 16a, 16b may also be mounted to base 12, which provides a sound, stable, and durable platform from which to detect acceleration of the vehicle 24. In one embodiment, accelerometers 16a, 16b are mounted to a circuit 28 which may then be shaped and sized to mount to base 12 in a suitable orientation as shown in FIG. 5B. For example, circuit 28 may be mounted to extend in a plane that is substantially perpendicular to the place of the base 12. Controller 20 may also be mounted on the circuit 28.

In one illustrative embodiment, the device 10 for indicating rapid deceleration is self-contained within a structural housing unit 22. Thus, base 12, warning indicator 14, sensor system 16, and controller 20 are all mounted within housing unit 22 which may even comprise base 12. In a further embodiment of the invention, housing unit 22 is a center high-mount brake light assembly suitable for use in a motor vehicle, such as a car, truck, or motorcycle.

Device 10 may also include a manual switch 30 to initiate warning indicator 14 despite no urgent deceleration condition being indicated by controller 20. The manual switch 30 may be preferably located within the vehicle 24 for easy access by the operator to warn others of an upcoming danger or to augment existing urgent light flashing systems in the vehicle 24.

Figure 6:
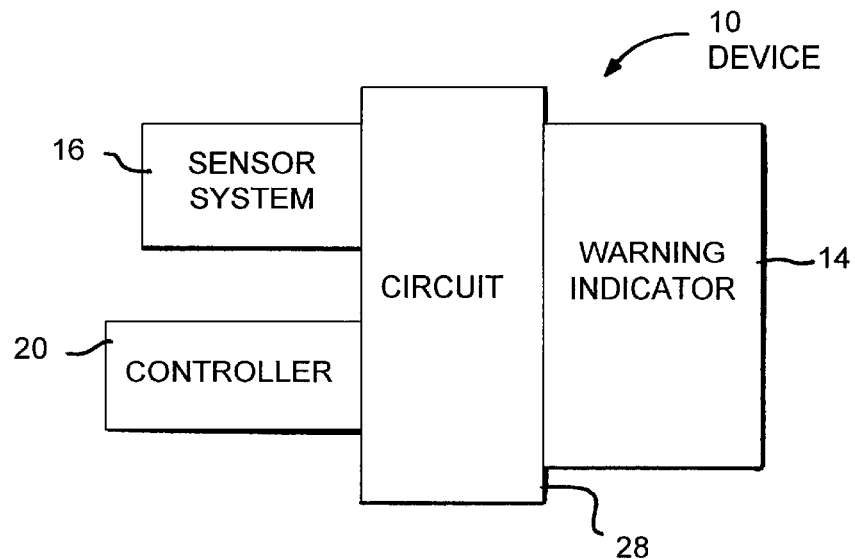
FIG. 6 is a schematic representation of an embodiment of the invention.

In one embodiment of the invention as shown in FIG. 6, warning indicator 14 may be a set of LEDs which are mounted on one side of circuit 28 facing outward towards the rear of the vehicle. Appropriately oriented sensor system 16 and/or controller 20 may be mounted parallel to and behind circuit 28 and in one embodiment of the invention, may be mounted on the opposite side of circuit 28 containing the LEDs, thus, decreasing the parts and volume of device 10 by combining warning indicator 14, sensor system 16, and controller 20, into one unit, namely, circuit 28. Many devices are capable for mounting LEDs, sensor systems, and controllers, including, but not limited to, circuits such as circuit boards and integrated chips.

As described above, warning indicator 14 may be a single warning indicator or may be multiple warning indicators. Multiple warning indictors may be initiated by controller 20 when output from sensor 16 exceed the threshold value or, each warning indicator might have its own associated threshold value such that one or more warning indicators are initiated as different thresholds are exceeded. For example, if the acceleration exceeds a first threshold, then controller 20 may initiate a subset of warning indicator 14. If acceleration exceeds a second threshold, controller 20 may initiate another subset of warning indicator 14. Of course, any suitable combination of one or more subsets of warning indicator 14 may be initiated depending upon which threshold is exceeded.

In one illustrative embodiment, warning indicator 14 will remain initiated by controller 20 for as long as the urgent deceleration condition occurs. More preferably, warning indicator 14 will remain initiated for a predetermined period of time after the urgent deceleration condition is complete.

What is claimed is:

1. An urgent deceleration indicating device to selectively activate a warning indicator comprising:
   (a) at least one warning indicator adapted to indicate a warning at least external to vehicle;
   (b) a sensor system, having an output, responsive to acceleration in a primary direction of vehicle motion; and
   (c) a controller responsive to the output of the sensor system, the controller correcting for gravitational effects such that at least one warning indicator is initiated when the acceleration exceeds at least one threshold value.

2. The device as claimed in claim 1, wherein the sensor system is further responsive to the pitch angle of the vehicle.

3. The device as claimed in claim 1, wherein the sensor system includes a first accelerometer responsive to acceleration in the primary direction of vehicle motion and a second accelerometer responsive to acceleration in a direction other than the primary direction of vehicle motion.

4. The device as claimed in claim 3, wherein the first accelerometer and the second accelerometer sense acceleration in respective directions that are substantially orthogonal to each other.

5. The device as claimed in claim 4, wherein the second accelerometer senses acceleration substantially along a vehicle vertical direction and the first accelerometer senses acceleration substantially along the primary direction of vehicle motion.

6. The device as claimed in claim 1, wherein the at least one warning indicator includes at least one light.

7. The device as claimed in claim 6, wherein the at least one light is suitable for use as a vehicle brake lamp.

8. The device as claimed in claim 6, wherein the at least one light is placed contiguous to a center high-mount stop lamp suitable for use in a vehicle.

9. The device as claimed in claim 8, wherein the at least one light comprises a first light placed to one side of the center high-mount stop lamp and a second light placed to the other side of the center high-mount stop lamp.

10. The device as claimed in claim 6, wherein at least one light is placed contiguous to a brake lamp suitable for use in a vehicle.

11. The device as claimed in claim 1, wherein at least one threshold value is substantially equal to a magnitude of acceleration due to gravity and acceleration indicative of an urgent deceleration condition.

12. The device as claimed in claim 1, wherein the output of the sensor system responsive to acceleration in the primary direction of vehicle motion is corrected for effects due to gravity, and at least one threshold value is substantially equal to an acceleration indicative of an urgent deceleration condition.

13. The device as claimed in claim 12, wherein the acceleration indicative of an urgent deceleration condition is substantially equal to 0.3 G.

14. The device as claimed in claim 1, wherein at least one threshold value is corrected for vehicle pitch.

15. The device as claimed in claim 1, wherein the controller resolves output from the sensor system into a pitch angle of the vehicle.

16. The device as claimed in claim 15, wherein at least one warning indicator is initiated when the acceleration exceeds at least one threshold value and an absolute value of the pitch angle of the vehicle exceeds at least one angle threshold value.

17. The device as claimed in claim 16, wherein at least one angle threshold value is substantially equal to 45 degrees.

18. The device as claimed in claim 1, wherein at least one warning indicator remains initiated for a predetermined period of time after the urgent deceleration condition is complete.

* * * * *